United States Patent [19]

Teramoto et al.

[11] 4,425,300
[45] Jan. 10, 1984

[54] HARD FACING NICKEL-BASE ALLOY

[75] Inventors: Takao Teramoto; Kensuke Hidaka, both of Kyoto, Japan

[73] Assignee: Fukuda Metal Foil & Powder Co., Ltd., Kyoto, Japan

[21] Appl. No.: 259,178

[22] Filed: Apr. 30, 1981

[30] Foreign Application Priority Data

May 2, 1980 [JP] Japan .................................. 55-60229

[51] Int. Cl.³ ............................................ C22C 19/05
[52] U.S. Cl. .................................... 420/453; 420/454; 420/584; 420/585
[58] Field of Search .................... 75/171, 122, 134 F; 148/32

[56] References Cited

U.S. PATENT DOCUMENTS 2,899,302  8/1959  Cape et al. ........................... 75/171

Primary Examiner—R. Dean
Attorney, Agent, or Firm—Fidelman, Wolffe & Waldron

[57] ABSTRACT

Hard facing nickel-base alloy comprising 10 to 25% by weight of chromium, 3 to 15% by weight of molybdenum, 3 to 7% by weight of silicon, 1 to 2.5% by weight of carbon and 1 to 30% by weight of iron, the balance being substantially nickel. The alloy may also contain up to 0.4% by weight of boron, up to 15% by weight of cobalt, up to 4% by weight of tungsten, up to 3% by weight of tantalum or up to 2% by weight of tin, or two or more of these elements, if necessary. No porosity is likely to be produced in the hard facing layer of the alloy formed on a relatively small piece of base metal.

4 Claims, 4 Drawing Figures

HARD FACING NICKEL-BASE ALLOY

BACKGROUND OF THE INVENTION

This invention relates to a hard facing nickel-base alloy which is not only highly to wear, corrosion, erosion and heat but also particularly suitable for application to relatively small-sized pieces of base metal by gas welding.

It has been customary to apply a hard facing alloy to the surface of an object such as the disc or seat ring of a valve made of cast steel so as to prevent wear, corrosion, errosion, etc. of the material at high temperature.

Among various hard facing alloys there is known a cobalt-base alloy consisting of 26 to 29% by weight of chromium (Cr), 4 to 6% by weight of tungsten (W), 0.9 to 1.2% by weight of carbon (C), up to 1.5% by weight of silicon (Si) and up to 3% by weight of iron (Fe), the balance being cobalt (Co). The cobalt-base alloy has a hardness of 38 to 47 to Rockwell C scale and is superior in wear and corrosion resistance at high temperature. However, in recent years the price of cobalt has taken a jump due to shortage of resources so that the above-mentioned cobalt-base alloy has become very expensive. Therefore, there has been a constant demand for low-priced hard facing nickel-base alloys which can replace the cobalt-base alloy.

In an effort to meet the demand the present inventors have conducted various studies and experiments and already invented highly tough hard facing nickel-base alloys such that when they have been applied onto a large piece of base metal or a base of a metal having a thermal expansion coefficient greatly different from that of the alloy, no cracks or fissures occur in the applied alloy layer. The alloys have been disclosed in Japanese patent application Nos. 53-30709 and 53-103402 and PCT application No. PCT/JP 79/00026.

Indeed the above-mentioned alloys have good weldability onto the surface of the disc or seat ring of a large-sized valve made of cast steel, but they have a disadvantage that when applied onto the surface of a relatively small object, e.g., the disc or seat ring of a small-sized valve having a diameter of less than 25 mm, porosity is likely to be formed in the hard facing layer.

Gas welding and TIG welding can be used for application of hard facing alloy onto the surface of an article such as the disc or seat ring of a valve made of cast steel. Gas welding, however, is more commonly employed on a relatively small object such as the above-mentioned small-sized valve having a diameter of less than 25 mm. If TIG welding is employed, dilution of the hard facing layer with the base metal is high due to the small size of the base. This is undesirable.

When the previously mentioned cobalt-base alloy is used for hard facing of a small article such as mentioned above, porosity is unlikely to be formed in the hard facing layer. After extensive examination of the reasons why this is so the present inventors have found out that if a nickel-base alloy has (1) a solidus line have 1200° C. and (2) a liquidus line below 1350° C., porosity is seldom produced in the hard facing layer of the alloy formed on relatively small-sized articles such as mentioned above.

Based on the above findings, the present inventors have studied and examined various compositions of nickel-base alloys and accomplished the present invention.

One object of this invention is to provide a hard facing nickel-base alloy which satisfies the above two conditions and is superior in wear resistance and corrosion resistance at high temperature as well as other characteristics.

Other objects features and advantages of the invention will become apparent from the following detailed description with reference to the accompanying drawings.

SUMMARY OF THE INVENTION

The alloy of the invention consists of 10 to 25% by weight of chromium, 3 to 15% by weight of molybdenum, 3 to 7% by weight of silicon, 1 to 2.5% by weight of carbon, and 1 to 30% by weight of iron, the balance being substantially nickel. If necessary, one or more than two elements selected from the group consisting of boron, cobalt, tungsten, tantalum and tin may also be added to the above essential composition in amounts up to 0.4, 15, 4, 3 and 2% by weight, respectively.

DETAILED DESCRIPTION OF THE INVENTION

When the alloy of the invention which has a solidus line above 1200° C. and a liquidus line below 1350° C. has been applied by means of gas welding onto a relatively small-sized article to form a hard facing layer thereon, no porosity occurs in the layer. The reasons why this is so are believed to be as follows:

Gas welding for hard facing employs an oxyacetylene torch usually so adjusting as to produce an excess-acetylene flame having a blue envelope or feather about three times the length of the bright inner cone at the tip of the nozzle. The flame contains fine free carbon particles, and when the flame is applied to the surface of a base metal, the carbon particles are attached to the surface of the base to carburize the base metal in a surface layer thereof. This lowers the melting point of the surface layer to 1200° C. further down to about the eutectic temperature of iron and carbon, that is, about 1150° C., so that the surface layer is melted into a state known as "sweating". Welding for hard facing is conducted by applying drops of melted material of a welding rod onto the sweating surface of the base metal. If the base is of a relatively small size, heat applied for welding raises the temperature of the whole base metal to the sweating temperature thereby causing porosity to be produced in the hard facing layer as it solidifies unless a hard facing alloy having proper liquidus and solidus lines is used.

Figure 2:
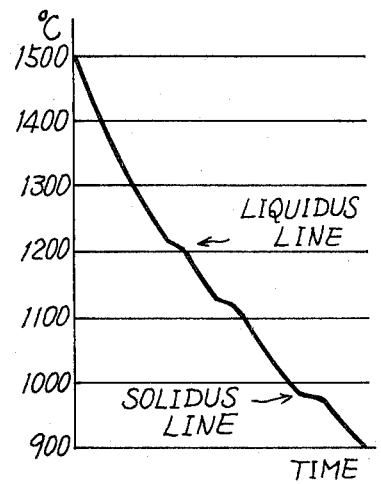
FIGS. 2, 3 and 4 are graphs of the cooling curves of Reference Nos. 1, 2 and 4 of conventional compositions.

Porosity occurs in the following two cases:

(1) In case the hard facing alloy used has a solidus line (or the temperature at which the last portion of the liquid phase solidifies) lower than the sweating temperature of the base metal, that is, 1150°– C.–1200° C. or the alloy has a cooling curve such as shown in FIG. 2, when the melted hard facing alloy on the surface of the base metal begins to solidify, the temperature of the base metal still remaining higher than the solidus line of the hard facing alloy prevents cooling of that portion of the deposited alloy which is adjacent to the surface of the base metal so that the portion of the alloy immediately above the base metal surface solidifies last and porosity is likely to occur in the hard facing layer adjacent to the surface of the base metal.

Figure 3:
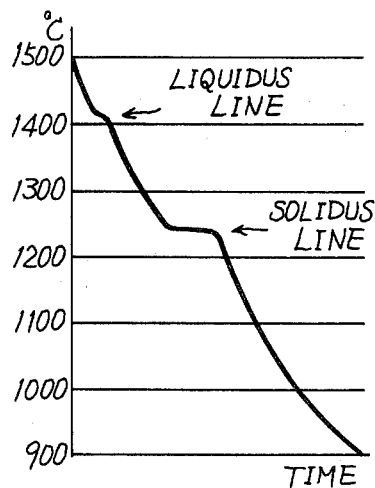

(2) In case the hard facing alloy used has such as extremely high liquidus line that the distance or gap between the solidus and liquidus lines is two great even if the solidus line is higher than the sweating temperature of the base metal, or in case the alloy has a cooling curve such as shown in FIG. 3, the primary phase in the melted alloy on the surface of the base metal immediately begins to solidify, so that an outer shell or cover is first formed on the deposited hard facing layer without accompanying reduction or shrinking of the volume of the deposited hard facing alloy, after which the liquid phase within the shell solidifies with resulting shortage of the amount of the liquid phase to fill the shell and production of porosity in the hard facing layer of the alloy.

Figure 1:
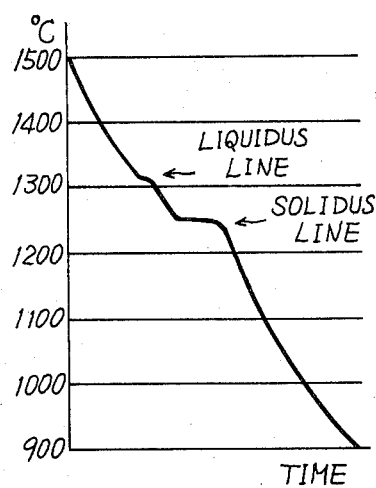
FIG. 1 is a graph showing the cooling curve of Specimen No. 1 of the hard facing nickel-base alloy of the invention.

Since the hard facing nickel-base alloy of the invention has such a composition that the solidus line is above 1200° C. whereas the liquidus line is below 1350° C., as shown in FIG. 1, no porosity is likely to be produced in the hard facing layer formed on a small-sized base metal by gas welding.

The nickel-base alloy of the invention is designed for hard facing applications on the basis of the observation that the eutectic composition of the Ni-Cr-Mo-C alloy system with 17% by weight of Cr, 7% by weight of Mo, and 2% by weight of C, the balance being Ni has a eutectic temperature of about 1240° C.

The eutectic alloy of the above-mentioned composition is a eutectic of a nickel solid solution and complex chromium carbide containing molybdenum (which will be referred to as the 1240° C. eutectic hereinafter). The 1240° C. eutectic has a hardness of 28 to 30 in Rockwell C scale, which is too low as compared with the previously mentioned known cobalt-base alloy and therefore must be increased or raised. To increase the hardness, the composition may be shifted from the eutectic to the hypereutectic range so as to increase the amount of the complex chromium carbide crystallized at the primary phase. Such shifting, however, disadvantageously causes the crystallization temperature of the primary phase (or the liquidus line) to be raised, so that there is a limit to increasing the hardness while keeping the liquidus line below 1350° C. The highest value of hardness that can be attained by the above-mentioned technique is 38 to 40 in Rockwell C scale.

Accordingly, the present inventors have examined various method of increasing the hardness of the above-mentioned 1240° C. eutectic and succeeded in levelling up the hardness of the 1240° C. eutectic by adding silicon and iron to the eutectic composition. If necessary, a small amount of boron may be added to increase the hardness of the 1240° C. eutectic. According to the invention cobalt and tungsten may also be added to improve the heat resistance and the toughness of the alloy and tantalum and tin, to improve the corrosion resistance thereof.

The reasons why the specific ranges of percentage of the component elements of the alloy of the invention have been selected as given herein will now be explained.

(1) Chromium (Cr).

A small portion of the chromium in the alloy of the invention is dissolved in the nickel in the solid state while the remaining large portion thereof is combined with carbon to form a complex chromium carbide containing molybdenum to be described later. The complex forms a eutectic with the nickel solid solution, which is the previously described 1240° C. eutectic and contributes mainly to the solidus line of the alloy of the invention.

Figure 4:
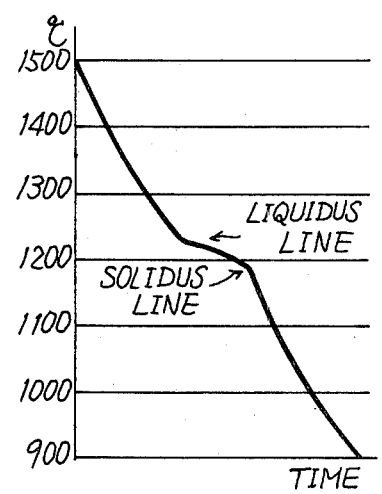

With less than 10% by weight of chromium, the eutectic portion of the cooling curve slopes down as shown in FIG. 4 with resulting formation of an incomplete 1240° C. eutectic and lowering of the solidus line of the alloy. As the added amount of chromium increases over 20% by weight, complex chromium carbide begins to crystallize as a primary-phase carbide, and upon further increase of chromium added the amount of the primary-phase carbide increases with resulting rise of the crystallization temperature (the liquidus line) of the primary phase. When the amount of chromium exceeds 25% by weight with addition of the maximum amounts of molybdenum and carbon to be described later, the liquidus line exceeds 1350° C.

Chromium also helps increase the heat and corrosion resistance of the alloy.

(2) Molybdenum (Mo).

Molybdenum raises the eutectic temperature of the nickel solid solution and the complex chromium carbide containing the molybdenum. In other words, the eutectic temperature of the 1240° C. eutectic can be stabilized between 1235° and 1250° C. only by addition of molybdenum to the composition. Less than 5% by weight of molybdenum added, however, has little effect so that the eutectic portion of the cooling curve slopes down as shown in FIG. 4 with resulting incomplete formation of the 1240° C. eutectic. On the other hand, with more than 15% by weight of molybdenum, the amount of the primary-phase of complex chromium carbide increases just as with chromium and the crystallization temperature (or the liquidus line) exceeds 1350° C.

Addition of molybdenum is effective in improving the resistance to acid and, though only slightly, the hardness of the alloy.

(3) Silicon (Si).

Silicon is dissolved in nickel in the solid state thereby to increase the hardness of the nickel solid solution and consequently that of the alloy. With less than 3% by weight of silicon, the hardness is not appreciably increased. With more than 7% by weight of silicon, a new solidus line appears at about 1100° C. below the eutectic temperature of 1240° C., so that the alloy cannot have the required characteristics.

Silicon also helps increase the resistance of the alloy to oxidation and corrosion.

(4) Iron (Fe).

Iron is dissolved in nickel in the solid state to help increase the solubility of carbon in the nickel solid solution thereby to increase the hardness of the nickel solid solution and consequently that of the alloy. Iron is dissolved also in the complex chromium carbide in the solid state to help stabilize the eutectic temperature of 1240° C.

With less than 1% by weight of iron, no appreciable increase is observed in the solubility of carbon in the nickel solid solution and consequently in the hardness of the alloy, and the eutectic portion in the cooling curve slopes down as shown in FIG. 4. This lowers the solidus line below 1200° C. so that when the alloy is applied for hard facing, porosity occurs in the hard facing layer. With more than 30% by weight of iron, the resistance of the alloy to heat and corrosion is deteriorated although the solidus line is not adversely affected.

(5) Carbon (C).

Carbon is combined with the above-mentioned chromium, molybdenum, iron, etc. into the primary complex chromium carbide and the eutectic of nickel solid solution and complex chromium carbide thereby to help increase the hardness of the alloy.

With less than 1% by weight of carbon, complex chromium carbide is not formed as the primary phase but a hypo-eutectic is produced, with resulting decrease in the hardness of the alloy.

With more than 2.5% by weight of carbon, the amount of primary complex chromium carbide increases with increasing amounts of chromium and molybdenum thereby causing the liquidus line to exceed 1350° C. so that the alloy cannot have the required characteristics.

(6) Boron (B).

Boron is added if necessary so as to be dissolved in the nickel solid solution in the solid state. The element helps increase the hardness of the nickel solid solution and consequently that of the alloy.

The maximum amount of boron to be added is 0.4% by weight. With more than that amount, a new solidus line appears about 980° C. below the previously mentioned eutectic temperature of 1240° C., so that the alloy cannot have the required characteristics.

(7) Cobalt (Co), tungsten (W), tantalum (Ta) and tin (Sn).

One or more than two of up to 15% by weight of cobalt, up to 4% by weight of tungsten, up to 3% by weight of tantalum, and up to 2% by weight of tin are added if necessary. These elements do not have appreciable influence over the solidus or the liquidus line of the alloy provided that they are added in an amount less than their respective upper limits. Cobalt and tungsten help to improve the toughness of the alloy at high temperature and tantalum and tin, the resistance of the alloy to acid and corrosion.

DESCRIPTION OF PREFERRED EMBODIMENTS

Preferred embodiments of the invention will be given below.

Table I shows the composition of the thirteen alloys (Specimen Nos. 1 to 13) of the invention as compared with the conventional alloys (Reference Nos. 1 to 4) together with the results of thermal analysis of the alloys and the results of the tests on the hard facing layers formed by gas welding.

The alloys of the invention are prepared by mixing a mother alloy with individual metals in accordance with the predetermined proportions, melting the mixture in a high frequency induction furnace and casting the melt into a shell mould to produce 5 mm$\phi$ welding rods.

For thermal analysis, 100 g of the welding rods are broken into small pieces, which are put into an alumina crucible. The curcible with the alloy pieces therein is then put into an electric furnace in an atmosphere of argon, so that the alloy pieces are remelted and heated up to 1500° C., whereupon the electric furnace is deenergized with a thermocouple being held in the melted sample in the crucible, so that the temperature drop of the melt from 1500° to 900° C. is plotted against time by an automatic thermorecorder to produce a continuous cooling curve.

For testing the deposited hard facing layers the above-mentioned welding rod is used to form a facing layer on a 10 mm×20 mm surface area of a 10 mm×10 mm×20 mm base of low carbon steel by gas welding. A torch with a nozzle of 1.4 mm in diameter is used to heat the base metal with a 2×-feather flame until a sweating condition occurs simultaneously almost all over the surface of the base, whereupon the welding rod is moved over the base longitudinally from one to the opposite end thereof, causing three or four drops of the melt to fall from the tip end of the rod onto the surface of the base metal.

The deposited layer has a maximum thickness of about 3 mm, which is ground to a thickness of 1.0 to 1.4 mm and then tested for hardness and also checked for porosity having been formed in the layer.

As is apparent from Table I, the alloys of the invention have required solidus and liquidus lines as well as sufficient hardness for use as a material for hard facing by gas welding, and there is no porosity produced in the hard facing layer.

On the contrary, the alloys other than those of the invention have solidus and liquidus lines deviating from the required values, and although the hard facing layers have hardness of similar levels, porosity is produced in the layers.

It has now become apparent that the invention has successfully improved the weldability of the nickel-base alloy so that the alloys of the invention can be used for hard facing relatively small-sized objects such as the disc or seat ring of a small valve made of cast steel.

TABLE I

| | Alloy Composition (% by weight) | | | | | | Result of Thermal Analysis | | | Result of Test on Hard Facing Layer | |
|---|---|---|---|---|---|---|---|---|---|---|---|
| | Ni | Cr | Mo | Si | C | Fe | Other Elements | Liquidus Line | Solidus Line | Slope of Solidue Line | Hardness $H_RC$ | Porosity |
| Specimen No. | | | | | | | | | | | | |
| 1 | Bal. | 15 | 10 | 4 | 1.7 | 10 | — | 1320 | 1250 | None | 45.0 | None |
| 2 | " | 12 | 6 | 4 | 1.7 | 10 | — | 1240 | 1210 | A little | 40.0 | " |
| 3 | " | 20 | 6 | 6 | 1.5 | 2 | — | 1330 | 1230 | " | 47.6 | " |
| 4 | " | 15 | 15 | 4 | 1.5 | 10 | — | 1330 | 1230 | None | 44.5 | " |
| 5 | " | 17 | 6 | 4 | 2.5 | 25 | — | 1250 | 1240 | " | 40.7 | " |
| 6 | " | 15 | 6 | 4 | 1.0 | 10 | — | 1265 | 1250 | A little | 37.5 | " |
| 7 | " | 25 | 6 | 4 | 1.7 | 10 | — | 1300 | 1250 | None | 42.8 | " |
| 8 | " | 17 | 10 | 4 | 1.7 | 10 | B 0.3 | 1320 | 1235 | A little | 48.2 | " |
| 9 | " | 15 | 6 | 4 | 1.7 | 10 | Co 15 | 1235 | 1220 | None | 41.3 | " |
| 10 | " | 15 | 6 | 4 | 1.7 | 10 | W 4 | 1255 | 1235 | A little | 40.7 | " |
| 11 | " | 25 | 6 | 4 | 1.7 | 10 | Ta 2 Sn 1 | 1300 | 1250 | " | 42.7 | " |
| 12 | " | 17 | 7 | 4.5 | 1.8 | 10 | Co 10 W 2 B 0.1 | 1270 | 1230 | " | 46.1 | " |
| 13 | " | 15 | 6 | 4 | 2 | 15 | Co 8 W 1 Ta 0.5 Sn 0.5 B 0.05 | — | 1245 | None | 43.3 | " |

TABLE I-continued

| | Alloy Composition (% by weight) | | | | | | | Result of Thermal Analysis | | | Result of Test on Hard Facing Layer | |
|---|---|---|---|---|---|---|---|---|---|---|---|---|
| | Ni | Cr | Mo | Si | C | Fe | Other Elements | Liquidus Line | Solidus Line | Slope of Solidue Line | Hardness $H_RC$ | Porosity |
| Reference No. | | | | | | | | | | | | |
| 1 | ″ | 12 | — | 5.5 | 1.0 | 5 | B 0.5 W 2 | 1210 | 980 | None | 45.2 | Occurring |
| 2 | ″ | 28 | 4 | 4 | 2.8 | 0 | — | 1420 | 1240 | ″ | 47.4 | ″ |
| 3 | ″ | 30 | 6 | 4 | 1.7 | 10 | — | 1360 | 1240 | ″ | 43.0 | ″ |
| 4 | ″ | 15 | 6 | 4 | 1.7 | 0 | — | 1225 | 1190 | Occurring | 38.8 | ″ |

What we claim is:

1. A hard facing nickel-base alloy consisting essentially of 10 to 25% by weight of chromium, 3 to 15% by weight of molybdenum, 3 to 7% by weight of silicon, 1 to 1.2% by weight of carbon and 1 to 30% by weight of iron, the balance being substantially nickel.

2. The hard facing nickel-base alloy of claim 1, further containing up to 0.4% by weight of boron.

3. The hard facing nickel-base alloy of claim 1, further containing at least one element selected from the group consisting of cobalt, tungsten, tantalum and tin in amounts up to 15, 4, 3 and 2% by weight, respectively.

4. The hard facing nickel-base alloy of claim 2, further containing at least one element selected from the group consisting of cobalt, tungsten, tantalum and tin in amounts up to 15, 4, 3 and 2% by weight, respectively.

* * * * *